United States Patent
Lee et al.

(10) Patent No.: US 12,498,321 B2
(45) Date of Patent: Dec. 16, 2025

(54) SENSOR-CHIP AND MANUFACTURING METHOD THEREOF

(71) Applicants: The General Hospital Corporation, Boston, MA (US); Korea Advanced Institute of Science and Technology, Daejeon (KR)

(72) Inventors: Hakho Lee, Acton, MA (US); Hyungsoon Im, Peabody, MA (US); Nam Ho Bae, Daejeon (KR); Seok Jae Lee, Daejeon (KR); Kyoung Gyun Lee, Daejeon (KR); Kwang Hee Kim, Daejeon (KR); Kil Sun Roh, Daejeon (KR)

(73) Assignees: The General Hospital Corporation, Boston, MA (US); Korea Advanced Institute of Science and Technology, Daejeon (KR)

( * ) Notice: Subject to any disclaimer, the term of this patent is extended or adjusted under 35 U.S.C. 154(b) by 205 days.

(21) Appl. No.: 18/035,202

(22) PCT Filed: Nov. 1, 2021

(86) PCT No.: PCT/US2021/057546
§ 371 (c)(1),
(2) Date: May 3, 2023

(87) PCT Pub. No.: WO2022/098598
PCT Pub. Date: May 12, 2022

(65) Prior Publication Data
US 2023/0417667 A1    Dec. 28, 2023

Related U.S. Application Data

(60) Provisional application No. 63/109,229, filed on Nov. 3, 2020.

(51) Int. Cl.
G01N 21/552 (2014.01)
G01N 21/41 (2006.01)
G01N 21/59 (2006.01)

(52) U.S. Cl.
CPC ............ G01N 21/554 (2013.01); G01N 21/41 (2013.01); *G01N 2021/5903* (2013.01)

(58) Field of Classification Search
CPC ......... G01N 21/554; G01N 2021/5903; G01N 21/05; G01N 21/553; G01N 2035/00158
See application file for complete search history.

(56) References Cited

U.S. PATENT DOCUMENTS 5,313,264 A  *  5/1994  Ivarsson .............. G01N 21/648
                                                                356/73
10,379,111 B2    8/2019  Yokoyama et al.
(Continued)

FOREIGN PATENT DOCUMENTS

| CN | 101339128 | 1/2009 |
| CN | 102654459 | 9/2012 |

(Continued)

OTHER PUBLICATIONS

Im et al., "Label-free detection and molecular profiling of exosomes with a nano-plasmonic sensor," Nat Biotechnol., May 2014, 32(5): 490-495, 9 pages.
(Continued)

*Primary Examiner* — Thanh Luu
(74) *Attorney, Agent, or Firm* — Fish & Richardson P.C.

(57) ABSTRACT

Methods, systems, and apparatus, for a sensor-chip device for performing analysis on target substances. In one aspect, the sensor-chip assembly includes a chip body including a substrate, at least one metal layer formed on the substrate, and nanoholes formed in the metal layer, a base having an accommodating portion for accommodating the chip body,
(Continued)

and a fixing member fixing the chip body accommodated in the accommodating portion by being coupled to the base.

18 Claims, 13 Drawing Sheets

(56) References Cited

U.S. PATENT DOCUMENTS

| | | | |
|---|---|---|---|
| 10,557,847 | B2 | 2/2020 | Weissleder et al. |
| 2008/0278728 | A1* | 11/2008 | Tetz ............... G01N 21/554 356/445 |
| 2010/0133510 | A1* | 6/2010 | Kim ............... G01N 27/4145 257/253 |
| 2013/0065777 | A1 | 3/2013 | Altug et al. |
| 2013/0323858 | A1 | 12/2013 | Abdulhalim |
| 2014/0048930 | A1* | 2/2014 | Choi ............... H01L 23/482 257/737 |
| 2014/0170024 | A1 | 6/2014 | Fujimaki et al. |
| 2015/0211930 | A1 | 7/2015 | Yamada et al. |
| 2017/0023476 | A1* | 1/2017 | Altug ............... G01N 21/59 |
| 2019/0017105 | A1 | 1/2019 | Gerion et al. |

FOREIGN PATENT DOCUMENTS

| | | |
|---|---|---|
| EP | 2653903 | 10/2013 |
| WO | WO 2015/084800 | 6/2015 |
| WO | WO 2019/118495 | 6/2019 |
| WO | WO 2019/186416 | 10/2019 |

OTHER PUBLICATIONS

International Search Report and Written Opinion in International Appln. No. PCT/US2021/057546, mailed Jan. 31, 2022, 10 pages.

Yang et al., "Multiparametric plasma EV profiling facilitates diagnosis of pancreatic malignancy," Sci Transl Med., May 2017, 9(391):eaal3226, 10 pages.

* cited by examiner

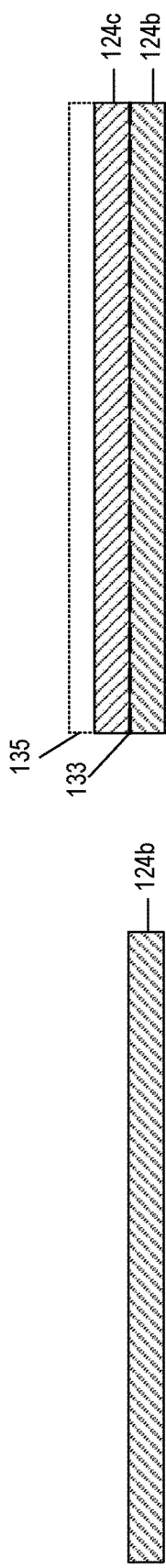
FIG. 7A
FIG. 7B
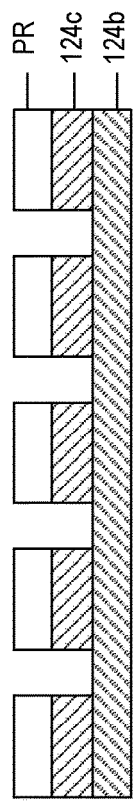
FIG. 7C
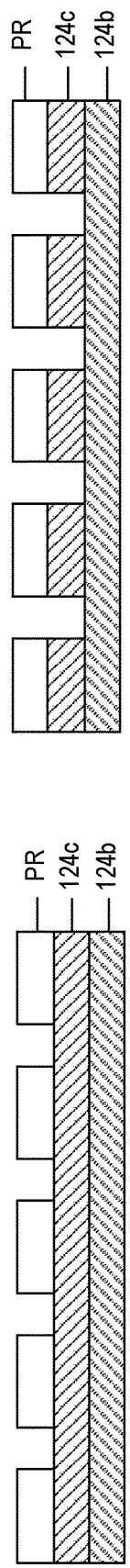
FIG. 7D
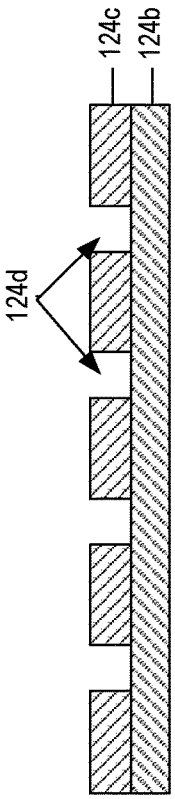
FIG. 7E ns filed on Nov. 1, 2021, which

SENSOR-CHIP AND MANUFACTURING METHOD THEREOF

CROSS-REFERENCE TO RELATED APPLICATIONS

This application is the U.S. National Phase Application under 35 U.S.C. § 371 of International Patent Application No. PCT/US2021/057546, filed on Nov. 1, 2021, which claims the benefit of U.S. Provisional Patent Application No. 63/109,229, filed Nov. 3, 2020, which is incorporated herein by reference in its entirety.

TECHNICAL FIELD

The disclosure relates to a sensor-chip using a surface plasmon resonance phenomenon, and a method of manufacturing the sensor-chip.

BACKGROUND

Surface plasmon resonance (SPR) techniques can be utilized in various industrial fields as means for detecting target substances. In general, a first portion of incident light is reflected by an interface between two media having different refractive indexes and a second portion is refracted, when one medium has a low refractive index and one medium has a high refractive index. Conditions for SPR include when the entire incident light is reflected at a specific incident angle, e.g., total internal reflectance. For example, incident light can be p-polarized light, a medium with a high refractive index is a dielectric, and a medium with a low refractive index can be a thin metal film. Under conditions where a wave vector component of the incident light is parallel with the thin metal film and is the same as the wave vector of surface plasmons most of the energy of the incident light is absorbed to the thin metal film, such that the charge density is at the interface where an analysis target substance is located.

SUMMARY

Implementations of the present disclosure are generally directed to a sensor-chip that can improve sensitivity to analysis target substances, and a method of manufacturing the sensor-chip.

More particularly, implementations of the present disclosure are directed to sensor-chips including fluidic chambers for performing biological assays on the plasmon-enhanced sensor-chips. Manufacturing methods are described for wafer-scale, mass-produced sensor chips including devices having low-touch handling housings with containment and incubation of biological samples and alignment fixtures for accurate, repeatable measurements on microscope systems.

In general, one innovative aspect of the subject matter described in this specification can be embodied in a sensor-chip assembly for detecting a target substance using surface plasmon resonance. The sensor-chip assembly includes a chip body including a substrate including a quartz or glass material, at least one metal layer formed on the substrate, and multiple nanoholes formed in the metal layer. The sensor-chip assembly further includes a base having an accommodating portion for accommodating the chip body, and a fixing member fixing the chip body accommodated in the accommodating portion by being coupled to the base, where a volume is defined in part by a first surface of the chip body and a second surface of the fixing member.

Other implementations of this aspect include corresponding systems, apparatus, and computer programs, configured to perform the actions of the methods, encoded on computer storage devices.

These and other implementations can each optionally include one or more of the following features: in some implementations, the at least one metal layer includes any one of gold (Au), silver (Ag), copper (Cu), aluminum (Al), and an alloy thereof.

In some implementations, the base includes at least one fastening protrusion protruding from a top surface of the base.

In some implementations, the sensor-chip assembly further includes a sealing member disposed between the base and the fixing member. The volume can be further defined by a third surface of the sealing member.

In some implementations, the sensor-chip assembly further includes a cover covering the chip body exposed through an opening of the fixing member, and where the volume is further defined by a fourth surface of the cover. The volume can retain at least a threshold volume of the target substance. The threshold volume of the target substance can include a volume of the target substance sufficient to contact the fourth surface of the cover and the target substance is uniformly distributed on the first surface of the chip body when the threshold volume of the target substance is dispensed.

In general, another innovative aspect of the subject matter described in this specification can be embodied in a sensor-chip assembly for detecting a target substance using surface plasmon resonance, where the sensor-chip assembly includes a chip body including a substrate, at least one metal layer formed on the substrate, and a plurality of nanoholes formed in the metal layer. The sensor-chip assembly further includes a housing having an accommodating portion for accommodating the chip body, and a fixing member fixing the chip body accommodated in the accommodating portion by being coupled to the housing, wherein a volume is defined in part by a first surface of the chip body and a second surface of the housing.

These and other implementations can each optionally include one or more of the following features: in some implementations, the housing includes at least one receptacle for coupling the fixing member to the housing. The sensor-chip assembly can include a cover covering the chip body exposed through an opening of the housing, and where the volume is further defined by a third surface of the cover. The volume can retain at least a threshold volume of the target substance. The threshold volume of the target substance can include a volume of the target substance sufficient to contact the third surface of the cover and the target substance is uniformly distributed on the first surface of the chip body when the threshold volume of the target substance is dispensed.

In some implementations, the sensor-chip assembly further includes a coupling protrusion, where a first coupling protrusion on a top surface a first sensor-chip assembly couples to a second coupling protrusion on a bottom surface of a second sensor-chip assembly when the first sensor-chip assembly and second sensor-chip assembly are stacked.

In some implementations, the sensor-chip assembly further includes an alignment feature to align the sensor-chip assembly with respect to a sensor system.

In general, another innovative aspect of the subject matter described in this specification can be embodied in methods for manufacturing a sensor-chip assembly for detecting a target substance using surface plasmon resonance. The method includes preparing a chip body, the preparation including preparing a substrate including a glass or quartz material, forming a metal layer on a side of the substrate, forming a photoresist pattern on the metal layer through a photolithography process, and forming nanoholes on the metal layer by etching and removing photoresist remaining on the metal layer. The methods further include preparing a base having an accommodating portion, disposing the chip body to be accommodated in the accommodating portion, and fixing the chip body accommodated in the accommodating portion to the base using a fixing member.

These and other implementations can each optionally include one or more of the following features: in some implementations, the methods further include disposing a sealing member between the base and the fixing member.

In some implementations, the methods further include dispensing a target substance on a first surface of the metal layer of the chip body, where the dispensed target substance is at least a threshold volume of target substance, and covering an exposed surface of the dispensed target substance with a cover. The dispensed target substance can contact at least the first surface of the metal layer of the chip body, a second surface of the base, and a third surface of the cover.

In some implementations, the methods further include exposing a top surface of the sensor-chip assembly to light emitted from a light source, where light from the light source that is incident on the chip body generates a surface plasmon resonance on the first surface of the chip body, and collecting, at a light receiver, a transmitted light signal from a bottom surface of the sensor-chip assembly.

In some implementations, the methods further include determining, from the emitted light from the light source and the transmitted light signal collected at the light receiver, a property of the target substance.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

Particular embodiments of the subject matter described in this specification can be implemented so as to realize one or more of the following advantages. The sensor-chip device can limit contact between the surface of the sensor-array and the environment, which can reduce contamination of the sample and resulting measurement. A reservoir included in the sensor-chip device can localize and retain the biological sample of interest. A combination of the reservoir to retain the biological sample and a coverslip protecting the biological sample from external contamination can result in a nearly flat surface to perform an optical measurement, e.g., a plasmonic measurement. According to some embodiments described herein, light transmission through the sensor-chip device can pass through only the biological sample, sensor chip, and the coverslip, and can thus minimize interference effects of additional layers.

Utilizing a no-contact receptacle including alignment points to align and retain the sensor-chip can improve accuracy/repeatability of measurements of samples as well as reduce throughput for generating test results. Sensor-chip assemblies including nanohole arrays can considerably improve sensitivity of a sensor-chip to analysis target substances, in order to detect and analyze low-molecular-weight or small amount of analysis target substances. Further, the manufacturing process of a sensor-chip can be simplified that can result in a reduction in the manufacturing time and cost of the sensor-chip device.

Bio-sensor systems utilizing surface plasmon resonance techniques can benefit from both specific reactivity to various types of target substances as well as can leverage generalized analysis techniques for various types of target substances. In particular, by directly measuring a mass change of the surface of a surface plasmon resonance sensor-chip, real-time analysis can be performed that measures the bonding of antigen-antibody/ligand/receptor pairs. Additionally, a bio-sensor system utilizing the SPR techniques can measure particular properties of target substances without damaging or compromising the target substances, e.g., can be a contact-free and damage-free measurement technique. Target substances can be analyzed using the bio-sensor system described herein without requiring pre-processing, e.g., can be deposited directly onto a surface of the nanohole array sensor chip, reducing time and processing required to perform an immunoassay or other analysis.

As described herein, a chip body included in a sensor-chip assembly can include a substrate made of transparent quartz or glass material and a metal layer formed directly on the substrate made of transparent quartz or glass material, and has nanoholes formed in the metal layer through a photolithography process. Accordingly, the manufacturing process of the sensor-chip assembly can be simplified, which can result in improved productivity. In some implementations, a chip body includes a substrate made of transparent quartz or glass material that transmits light, such that a process to separately form a hole-pattern on the substrate is not needed. Moreover, the sensor-chip assembly can be manufactured through a simplified process of forming the metal layer only on a side of the substrate and forming the nanoholes in the metal layers.

In some implementations, by using a substrate made of a quartz or glass material having high transmittance in the formation of the chip body, a thicker, more structurally stable thickness of the chip body can be utilized, reducing breakage during processing/transport/end-use and thereby improving yield of the sensor-chip assembly.

In some implementations, components of a sensor-chip assembly can be assembled without the use of screws and/or other similar fasteners, e.g., clips, springs, adhesives, and the like. A screw-free assembly utilizing fastening protrusions, e.g., small pillars, can allow for ease of assembly and self-aligning assembly using the pillars as alignment features.

In some implementations, components of a sensor-chip assembly can be manufactured using additive manufacturing techniques and/or computer numerical control (CNC) machining processes to achieve improved accuracy and tolerance, e.g., ~0.1 mm accuracy, ~0.1% tolerances) of the end product. Improved accuracy and tolerance of the sensor-chip assembly can result in improved signal precision, robustness and reproducibility, over multiple measurements of multiple different sensor-chip assemblies.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

FIGS. 7A-E are cross-sectional views illustrating a method of manufacturing a sensor-chip according to an embodiment of the disclosure.

Like reference numbers and designations in the various drawings indicate like elements.

DETAILED DESCRIPTION

Overview

Implementations of the present disclosure are generally directed to a sensor-chip that can improve sensitivity to analysis target substances, and a method of manufacturing the sensor-chip. More particularly, implementations of the present disclosure are directed to a sensor-chip assembly including a fluidic chamber for performing biological assays on plasmon-enhanced nanohole arrays. Manufacturing methods are described for wafer-scale, mass-produced sensor chip assemblies including devices having low-touch handling housings with containment and incubation of biological samples and alignment fixtures for accurate, repeatable measurements on microscope systems.

Example Sensor-Chip Assembly and System

Figure 1A:
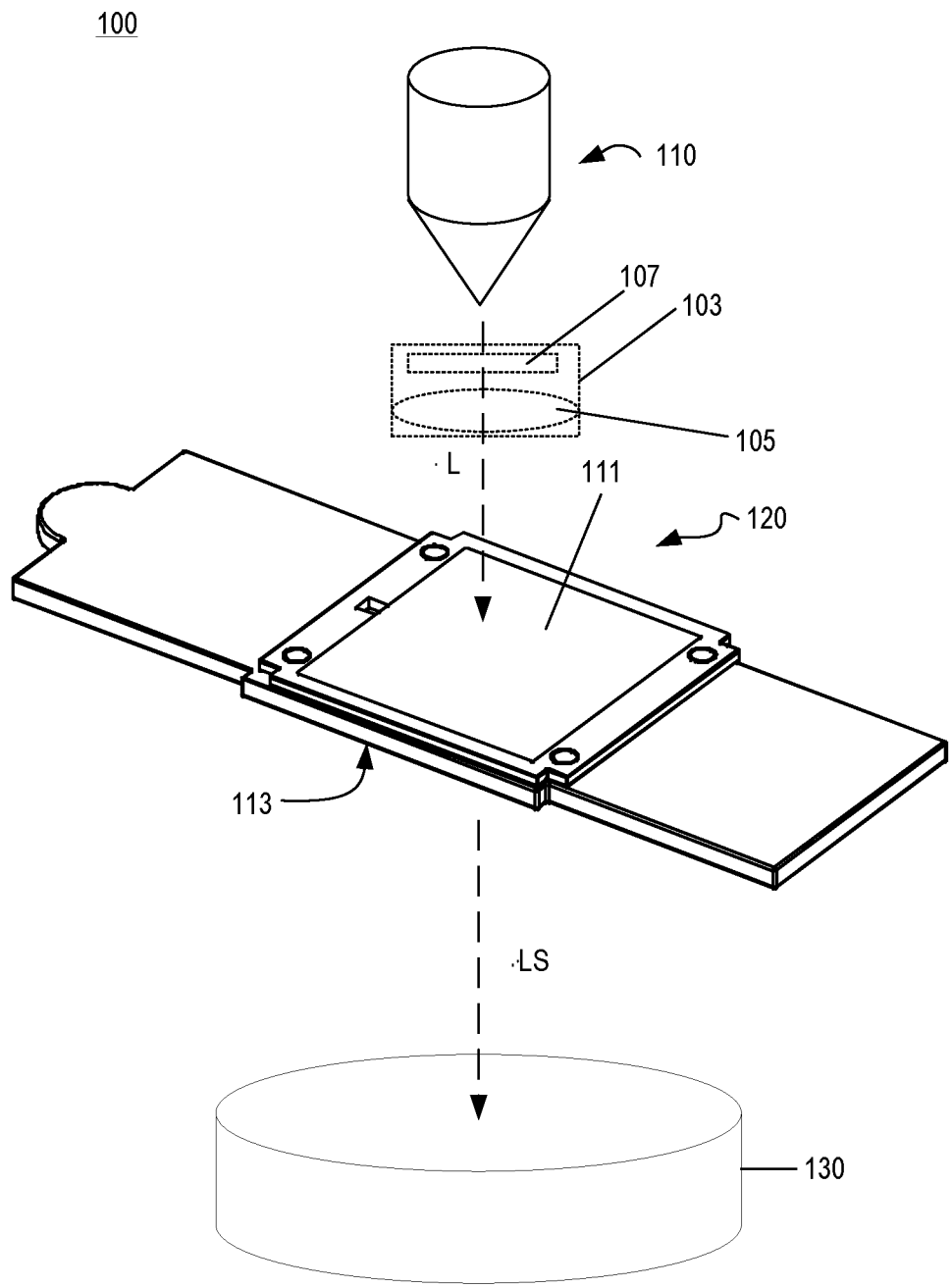
FIG. 1A is a view schematically illustrating an example bio-sensor system according to some embodiments of the disclosure.

FIG. 1A is a view schematically illustrating an example bio-sensor system according to some embodiments of the disclosure. A bio-sensor system 100 according to an embodiment of the disclosure includes a light source 110, a sensor-chip assembly 120, and a light receiver 130.

Light source 110 can be a monochromatic light source emitting a single wavelength or multiple wavelengths, e.g., ultraviolet (UV), visible (VIS), near-infrared (NIR), or a combination thereof, where a range of wavelengths can include light between 200 to 2500 nanometers. Light source 110 can be a white light source including a multi-wavelength emission band, a tungsten-halogen lamp (QTH lamp), a laser diode (LD), a light emitting diode (LED), or another similar source of light. Light source 110 can emit transverse magnet (TM) or p-polarized monochromatic light.

Light L emitted from light source 110 is incident on a front surface 111 of the sensor-chip assembly 120. An angle of incidence of the light L on the front surface 111 of the sensor chip assembly can be selected such that incident light L on the front surface 111 of the sensor-chip assembly 120 can result in light reflection or light transmission conditions, or a combination thereof, e.g., where a portion of the light is transmitted through the nanoholes and a portion of the light is reflected off of the nanoholes. The angle of incidence can range, for example, between 0 to 90 degrees.

In some implementations, light L emitted from light source 110 can directly illuminate a front surface 111 of the sensor-chip assembly 120. In some implementations, light L emitted from light source 110 optionally can be coupled via an optical assembly 103, e.g., including one or more lenses 105, diffusers 107, and/or optical fibers (not shown), to define an illumination area (e.g., including a subset of nanoholes of the multiple nanoholes of the sensor chip assembly), such that a single sensing spot in a sensing array can be individually read out. In some implementations, light L can be incident on a back surface 113 of sensor-chip assembly 120, such that light signal LS is emitted from a front-side of the sensor-chip assembly.

Light signal LS can be emitted from a back surface 113 of sensor-chip assembly 120, where light signal LS propagates out of a back-side of the sensor-chip assembly and is incident on a light receiver 130. Light receiver 130 can be a light detector configured to receive light signal LS and perform a quantitative measurement of a change of a wavelength due to resonance absorption of surface plasmons, for example, a color change or an intensity change. The change of the wavelength due to resonance absorption of surface plasmons can be utilized to extract properties of the target substance, for example, concentration of the target substance, binding affinity, dissociation/association rate constants, molecular weights, avidity of the target substance, or the like. Light receiver 130 can include, for example, a silicon photodiode (Si-PD), a charge coupling device (CCD) camera, a video camera, or a projection film that can image a two-dimensional plane, or can include a near-field microscope such as an optical microscope, a near-field scanning microscope, a spectrometer, etc.

In some implementations, imaging conditions include when the light source 110 emits light L that is directed through the sensor-chip assembly 120 including a dispersed analysis target substance being captured, e.g., attached in or through, by the nanoholes of the chip body. The light L includes a first wavelength of the incident light L. The transmitted light LS that has passed through the sensor-chip assembly includes a second wavelength that is different from the first wavelength. In other words, the wavelength of the incident light L that has passed through the metal layer 124c shifts to a different wavelength, e.g., red-shifts, when a target substance is captured by an array of nanoholes of a chip body included in the sensor-chip assembly such that the refractive index above a surface of a metal layer of the chip body changes, e.g., when the refractive index increases. Further discussion of the chip body is provided below with reference to FIGS. 3-7.

Figure 1B:
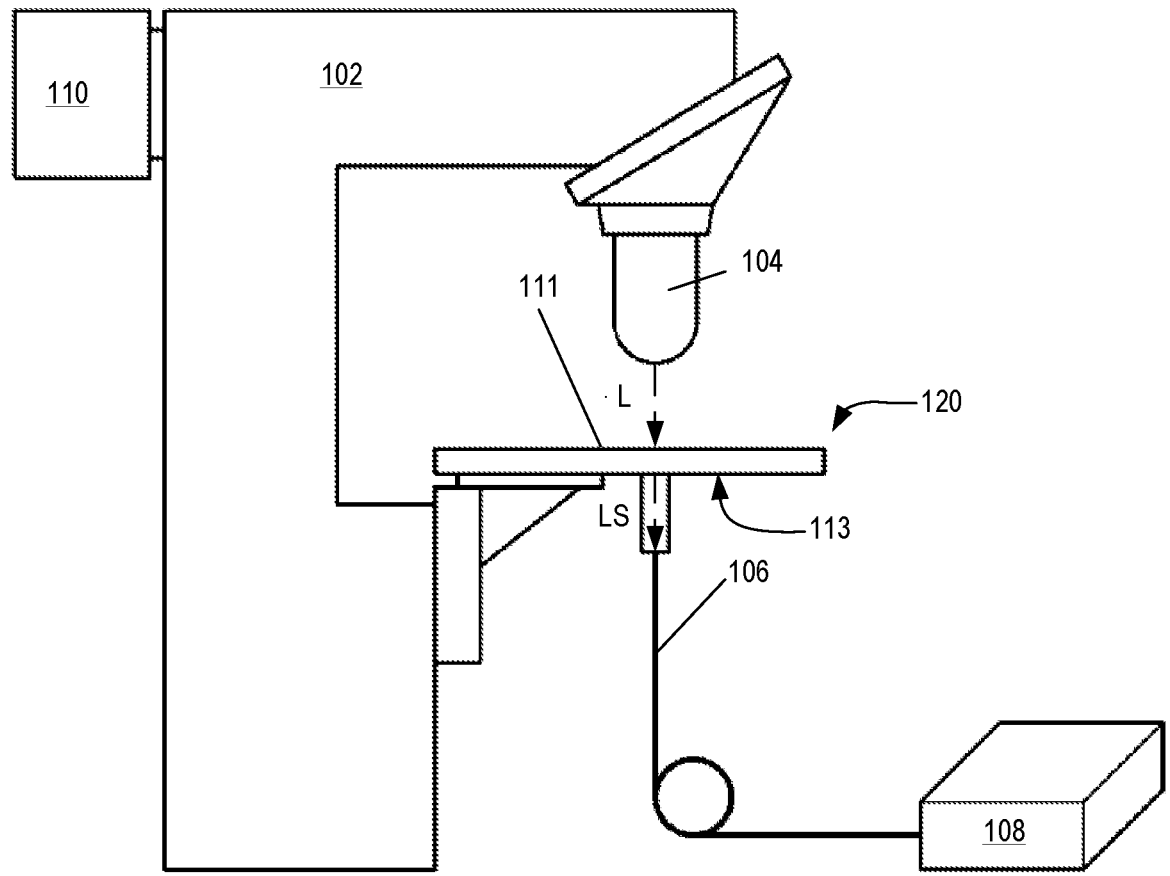
FIG. 1B is a view schematically illustrating another example bio-sensor system according to some embodiments of the disclosure.

In some embodiments, a bio-sensor system can include an optical microscope system. FIG. 1B is a view schematically illustrating another example bio-sensor system according to some embodiments of the disclosure. Optical microscope 102 can includes a light source 110, e.g., a tungsten white light source, and a microscope objective 104 including one or more lenses for coupling the light L from light source 110 to a front surface 111 the sensor-chip assembly 120. Light signal LS can be collected from a back surface 113 of the sensor-chip assembly by an optical fiber 106 and provided to an imager 108, e.g., a CMOS imager and/or a spectrometer.

Figure 2:
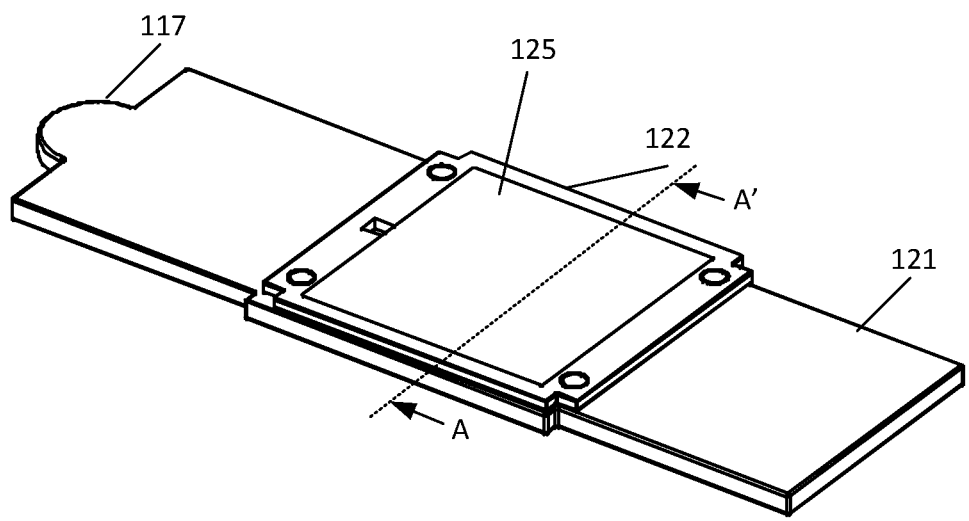
FIG. 2 is a perspective view of a sensor-chip assembly according to an embodiment of the disclosure.

Referring now to FIG. 2, FIG. 2 is a perspective view of a sensor-chip assembly according to an embodiment of the disclosure. Sensor-chip assembly can be made of various materials, for example plastic, (e.g., polyastic acid (PLA), acrylonitrile butadiene styrene (ABS), acrylic, high density polyethylene (HDPE), polycarbonate, etc.), resins, metal, carbon, glass, or other inert materials. Components of the sensor-chip assembly 120 may be manufactured using additive manufacturing techniques and/or computer numerically controlled (CNC) machining processes (e.g., CNC milling). The sensor-chip assembly 120 includes a base 121, e.g., a microscope slide or another supportive base. The base 121 can include an alignment feature 117, e.g., a notched portion, which can be used as an alignment point to align the sensor-chip assembly 120 with respect to the bio-sensor system 100 in order to perform a measurement on a target substance using the sensor-chip assembly 120. In one example, alignment feature 117 can be used to align the base 121 on a microscope stand or another similar fixture of the bio-sensor system 100.

Sensor-chip assembly 120 further includes fixing member 122 and cover 125, described below in further detail with reference to FIG. 3. Designated axis A-A is depicted in FIG. 2 with reference to the sensor-chip assembly.

Figure 3:
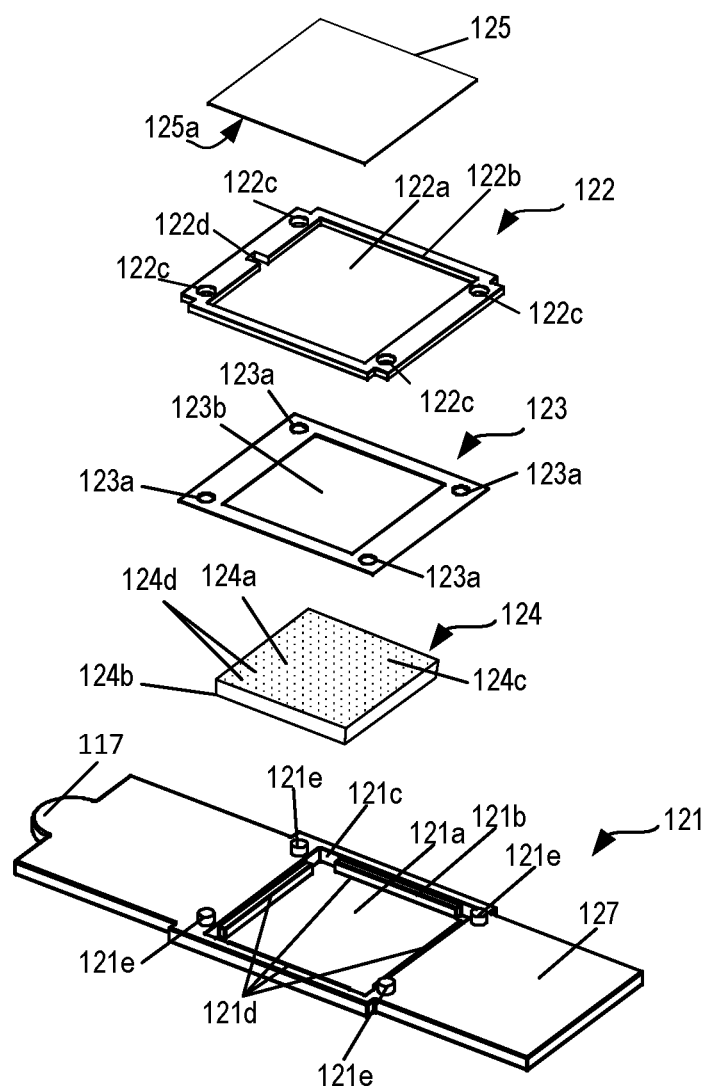
FIG. 3 is an exploded perspective view of the sensor-chip assembly according to an embodiment of the disclosure.

Referring now to FIG. 3 is an exploded perspective view of the sensor-chip assembly according to an embodiment of the disclosure, e.g., as depicted in FIGS. 1 and 2. The sensor-chip assembly 120 can include a base 121, a fixing member 122, a sealing member 123, a chip body 124, and a cover 125. Though sensor-chip assembly 120 is described herein as including components including a base 121, a fixing member 122, a sealing member 123, a chip body 124, and a cover 125, more or fewer components can be included in the sensor-chip assembly 120 without limiting the functionality of the sensor-chip assembly 120 in the bio-sensor system 100.

Base 121 can include an alignment feature 117, e.g., a tab or notch along a perimeter of base 121, that can be used to align the sensor-chip assembly 120 with respect to a bio-sensor system 100, e.g., align with respect to a light source 110. In some implementations, alignment feature 117 can be utilized by a human operator and/or robotic operator to handle the sensor-chip assembly 120 in a low-contact manner such that the human or robotic operator does not contact a portion of the sensor-chip assembly 120 that includes the chip body 124.

Base 121 can include an accommodating portion 121a into which the chip body 124 is accommodated and a supporting portion 121b protruding toward the accommodating portion 121a from the inner sides 121c of the base 121, e.g., a lip extending into the accommodating portion 121a from inner sides 121c of the base 121. In other words, chip body 124 can be at least partially retained in a window defined by the accommodating portion 121a and supported at least partially within the accommodating portion 121a by the supporting portion 121b. Accommodating portion 121a can be a window that has been removed or formed in the base 121. In some implementations, as depicted in FIG. 3, accommodating portion 121a is rectangular in shape. Accommodating portion 121a can alternatively be polygonal, circular, elliptical or another similar shape.

The supporting portion 121b can include multiple protrusions 121d supporting the chip body 124 in contact with the bottom surface of the chip body 124, such that the chip body 124 is supported by the multiple protrusions 121d while at least partially retained within the base 121. The multiple protrusions 121d can be formed or machined from the base 121 to support the edges of the chip body 124 when the chip body 124 is at least partially retained within the base 121. In some implementations, the multiple protrusions 121d can be affixed to the base 121, e.g., using adhesive.

The multiple protrusions 121d of the supporting portion 121b, as depicted in FIG. 3, can be rectangular in shape forming a "lip" around a portion of the perimeter defined by the accommodating portion 121a. In some implementations, other shapes and arrangement of the multiple protrusions 121d can be used to form the supporting portion 121b. For example, triangular protrusions 121d nested in each corner of the accommodating portion 121a can be utilized. In another example, a set of pins extending from the inner sides 121c into the accommodating portion 121a can form the supporting portion 121b.

The base 121 further can include multiple fastening protrusions 121e protruding upward from a top surface 127 of the base 121. The fastening protrusions 121e can be arranged on the top surface 127 of the base 121 such that, when the sensor-chip assembly 120 is assembled, a set of first fastening holes 122c formed within the fixing member 122 and a set of second fastening holes 123a in a sealing member 123 are aligned and secured with respect to the fastening protrusions 121e. As depicted in FIG. 3, four cylindrical fastening protrusions 121e are arranged with respect to the accommodating portion 121a, e.g., one on each respective corner of the window defined by the accommodating portion 121a. Other configurations including more or fewer fastening protrusions are contemplated. In some implementations, the fastening protrusions 121e can include cross-sectional shape that is rectangular, elliptical, polygonal, or the like.

A fixing member 122 can include an opening 122a and multiple first fastening holes 122c. In some implementations, as depicted in FIG. 3, fixing member 122 includes an insertion hole 122d. Opening 122a, as depicted in FIG. 3, can be a rectangular window defined in the fixing member 122. Other shaped windows defined in the fixing member 122 are possible, e.g., elliptical, polygonal, circular, or the like. In some implementations, opening 122a is defined such that a shape and dimensions of the opening 122a define a first area that is approximately equal to a second area defined by a shape and dimensions of the accommodating portion 121a.

Referring now to FIG. 1, light L from light source 110 is incident on a chip body 124 that is at least partially retained by the accommodating portion 121a of the base 121 through opening 122a of the fixing member 122, when the sensor-chip assembly 120 is assembled.

Referring now to FIG. 3, the multiple first fastening holes 122c can be formed, e.g., fabricated using CNC machining processes, surrounding opening 122a. The multiple first fastening holes 122c can be arranged with respect to the fixing member 122 such that, when the fixing member is assembled in the sensor-chip assembly 120, at least one of the first fastening holes 122c accommodates a respective fastening protrusion 121e. The fixing member 122 is coupled to the top surface 127 of the base 121 where at least one first fastening hole 122c accommodates a fastening protrusion 121e, thereby holding the chip body 124 fixed when the chip body is at least partially retained in the accommodating portion 121a of the base 121. First fastening holes 122c can have a shape and dimensions selected to accommodate the cross-sectional shape and dimensions of the fastening protrusions 121e, e.g., circular, rectangular, elliptical, polygonal, or the like.

Insertion hole 122d can be formed by machining a portion of the inner sides 122b of the fixing member 122, or by forming the fixing member 122, e.g., by extrusion, three-dimensional (3D) printing, etc., to include the insertion hole 122d as a part of the fixing member 122. Insertion hole 122d can be, for example, a notch beginning at one inner side of the inner sides 121c of the opening 122a and not extending through an outer edge of the fixing member 122. The insertion hole 122d can provide a space for inserting a tool or the like for separating cover 125 from the fixing member 122 when the cover 125 is positioned over the opening 122a.

In some implementations, the cover 125 can rest directly on the target substance dispensed on the chip body 124. Alternatively or additionally, the fixing member can include a lip or similar support that the cover 125 is at least partially supported by the fixing member 122 when the sensor-chip assembly is assembled.

In some implementations, sealing member 123 is disposed between the base 121 and the fixing member 122 when the sensor-chip assembly 120 is assembled, where the sealing member 123 can function to affix the base 121 and the fixing member 122. The sealing member 123 can retain a volume of analysis target substances dispensed on the chip body 124 and prevent the volume of analysis target substances dispensed on the chip body 124 from leaking to areas outside of the chip body 124.

The sealing member 123 can include multiple second fastening holes 123a and opening 123b. The second fastening holes 123a can be arranged with respect to the sealing member 123 such that, when the sensor-chip assembly 120 is assembled, at least one of the second fastening holes 123a accommodates a fastening protrusion 121e and where at least one of the second fastening holes 123a is aligned with a first fastening hole 122c. The second fastening holes 123a can be fitted on the fastening protrusions 121e, respectively, such that the sealing member 123 can be aligned at a predetermined position with respect to the base 121.

The sealing member 123 can include a silicon or rubber material to create a seal and prevents leakage of analysis target substances. The sealing member 123 may be composed of an inert material, e.g., one that does not significantly chemically react with analysis target sub stances.

In some implementations, the sealing member 123 can be integrally formed with the fixing member 122, e.g., extruded or 3D-printed.

In some implementations, cover 125 can be provided to cover a portion of a surface 124a chip body 124 exposed through the opening 122a when the sensor-chip assembly 120 is assembled. The cover 125 can be made of a material that has at least a threshold transmissivity for wavelengths of light source 110, e.g., quartz or glass material able to transmit the light from the light source 110.

The cover 125 is provided to have an area corresponding to the opening 122a. In some implementations, when the sensor-chip assembly 120 is assembled and at least a threshold volume of the analysis target substance is dispensed on a surface 124a of the chip body 124, bottom surface 125a of cover 125 is in contact with the analysis target substance such that the analysis target substance is uniformly distributed on the surface 124a of chip body 124.

In some implementations, cover 125 can be coupled and affixed to the fixing member 122, such that, when the fixing member 122 is coupled to the base 121, the cover 125 is aligned to cover the chip body 124 and the at least threshold volume of analysis target substance is dispensed on the surface 124a of the chip body 124 can be uniformly distributed on the chip body 124.

In some implementations, base 121, fixing member 122, sealing member 123, and cover 125 of the components of the sensor-chip assembly 120 described above are not necessary parts of the sensor-chip assembly 120, and the sensor-chip assembly 120 can include only the chip body 124.

In some implementations, sensor-chip assembly 120 can be composed of any one of the base 121, the fixing member 122, the sealing member 123, and the cover 125, or a combination of two or more of them, with the chip body 124. For example, the sensor-chip assembly 120 can be composed of only the base 121 and the chip body 124 or can be composed of only the base 121, the fixing member 122, and the chip body 124.

The chip body 124 can include a substrate 124b, a metal layer 124c formed on the substrate 124b, and nanoholes 124d formed in the metal layer 124c. The chip body 124, if necessary, can further include another metal layer (not shown) formed between the substrate 124b and the metal layer 124c, and in this case, a metal layer has a multi-layered structure.

The substrate 124b can include a material that is substantially transparent to wavelengths of light emitted by the light source 110, for example, transparent glass or quartz. Further, the substrate 124b, depending on the function and characteristics of the sensor-chip assembly 120, can include a transparent oxide such as a titanium oxide ($TiO_2$), a tantalum oxide ($Ta_2O_5$), Indium tin oxide (ITO), or an aluminum oxide ($Al_2O_5$).

Metal layer 124c can be selected in part based on the properties of the metal to reflect or transmit incident light that is on the chip body 124 from the light source 110 or to generate conditions under which surface plasmon resonance phenomenon occurs by absorbing the energy of incident light from light source 110. A composition of metal layer 124c, a thickness of the metal layer 124c, etc. can each be variables that can change surface plasmon resonance conditions.

Metal layer 124c can be selected based in part on an ease to discharge electrons in response to external stimulation and a negative dielectric constant of the material, for example, compositions that include at least one of gold (Au), silver (Ag), platinum (Pt), copper (Cu), aluminum (Al), or alloys thereof. For example, silver (Ag) can show the most sharp surface plasmon resonance peak, but can be denatured. In another example, gold (Au) has the advantage of having excellent surface stability and bio-affinity as well as low denaturation. In some implementations, it is preferable that metal layer 124c be made of gold (Au) or a gold-based alloy.

In some implementations, metal layer 124c can include a passivation layer that is formed from depositing a thin oxide or non-conductive layer, e.g., aluminum oxide, hafnium oxide, silicon nitride. In one example, a passivation layer formed using Ag can be utilized to enhance a chemical stability of the metal layer 124c.

In some implementations, metal layer 124c can have thickness of, for example, 10 to 300 nm, and preferably, 40 to 200 nm. In one example, when a thickness of the metal layer 124c is less than 10 nm, a weak surface plasmon resonance phenomenon is generated. In another example, when the thickness of the metal layer 124c exceeds 300 nm, a surface plasmon resonance occurs, but there can be a limit in precisely forming nanoholes perpendicularly through the metal layer.

In some implementations, a second metal layer (not shown) made of chrome (Cr), titanium (Ti), or another similar metal or metallic alloy, can be disposed between the metal layer 124c and the substrate 124b to stably maintain the coupling force (adhesive force) between the metal layer 124c and the substrate 124b.

Nanoholes 124d can be formed to penetrate from a surface 124a of chip body 124 through the metal layer 124c to substrate 124b. The nanoholes 124d can be arranged in two-dimensional rows and columns on the metal layer 124c with intervals selected based in part of the sizes of respective nanoholes 124d. That is, the nanoholes 124d can be arranged in a lattice shape on the metal layer 124c. In some implementations, nanoholes 124d can be formed on/within the metal layer 124c in a circular, an elliptical, or a polygonal shape. Details of the fabrication of the chip body 124 are further discussed with reference to FIGS. 7A-7E below.

Figure 4:
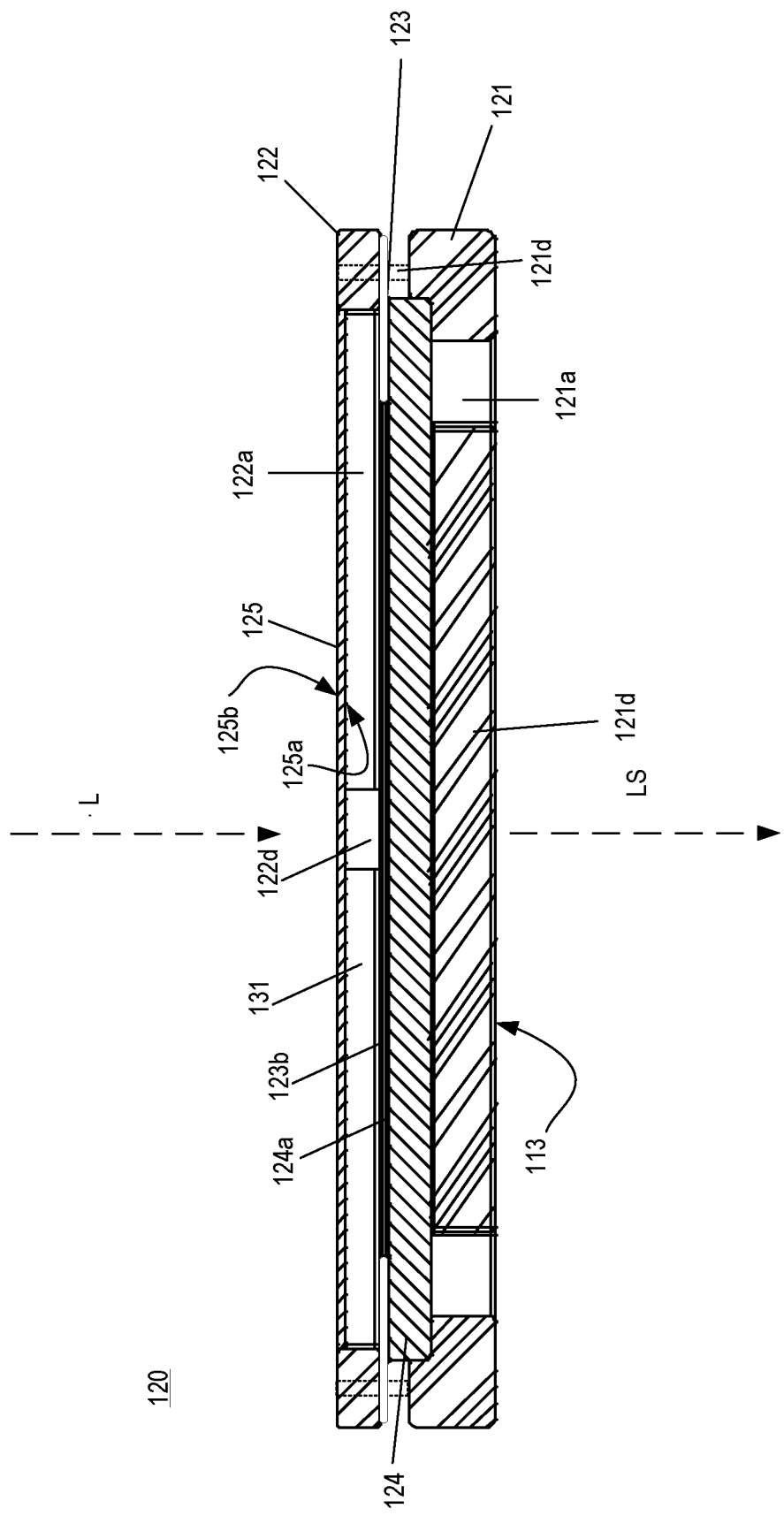
FIG. 4 is a cross-sectional view taken along line A-A' shown in FIG. 2.

FIG. 4 is a cross-sectional view taken along line A-A' shown in FIG. 2. As described with reference to FIGS. 2 and 3, sensor-chip assembly 120 includes base 121, chip body 124, sealing member 123, fixing member 122, and cover 125. As depicted in FIG. 4, the chip body 124 is supported by protrusions 121d when the chip body 124 is at least partially accommodated within the accommodating portion 121a of the base 121. Fastening protrusions 121e extend from the base 121 and are accommodated by first fastening hole (not shown) in sealing member 123 and second fastening hole (not shown) in fixing member 122 such that, when the sensor-chip assembly 120 is assembled, the sealing member, fixing member 122, and base 121 are aligned utilizing the fastening protrusions 121e.

Opening 122a within the fixing member 122, opening 123b within the sealing member, a bottom surface 125a of the cover 125, and a surface 124a of the chip body 124 define a volume 131 that can receive at least a threshold volume of dispensed target substance for analysis. The target substance can be dispensed on the surface 124a of the chip body 124 and cover 125 placed over the dispensed target substance and in contact with the dispensed target substance.

In some implementations, the target substance can be dispensed on the surface 124a of the chip body 124 via insertion hole 122d while the cover 125 is aligned with respect to opening 122a of the fixing member 122.

As described with reference to FIG. 3, insertion hole 122d formed in the fixing member 122 can accommodate a tool to manipulate, e.g., place or remove, the cover 125 with respect to the sensor-chip assembly 120.

As described with reference to FIG. 1, light L from light source 110 can be provided incident on the sensor-chip assembly 120 at a top surface of the sensor assembly, e.g., surface 125b of the cover 125. Light signal LS can be emitted from a back surface 113 of sensor-chip assembly 120, and received by light receiver 130.

Figure 5:
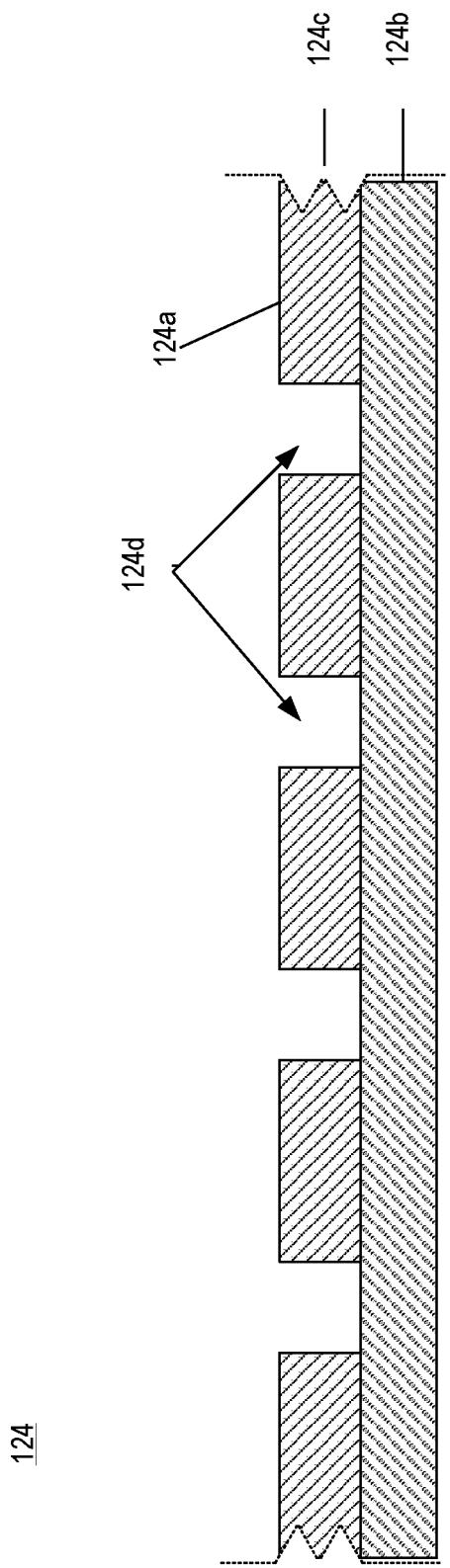
FIG. 5 is a view illustrating a partial cross-section of a sensor-chip.

FIG. 5 is a view illustrating a partial cross-section of a chip body. Chip body 124, as described with reference to FIGS. 1-4, includes a substrate 124b and metal layer 124c formed on a surface of the substrate 124b. Chip body 124 further includes an array of periodically spaced nanoholes 124d where each nanohole 124d can extend from a surface 124a of the metal layer 124c to a surface of the substrate 124b. In some implementations, nanohole diameter sizes can range from 30 to 500 nm, with a the periodicity (i.e., spacing between adjacent nanoholes) varying from 300 to 2000 nm. The nanoholes could be arranged in rectangular or hexagonal arrays. Nanohole diameter sizes and periodicity can be uniform across a chip body or can vary across the chip body. For example, a chip body can include multiple arrays each having different nanohole diameter sizes and/or different periodicities. Further details of the fabrication of the chip body 124 are described with reference to FIGS. 7A-7E.

Figure 6A:
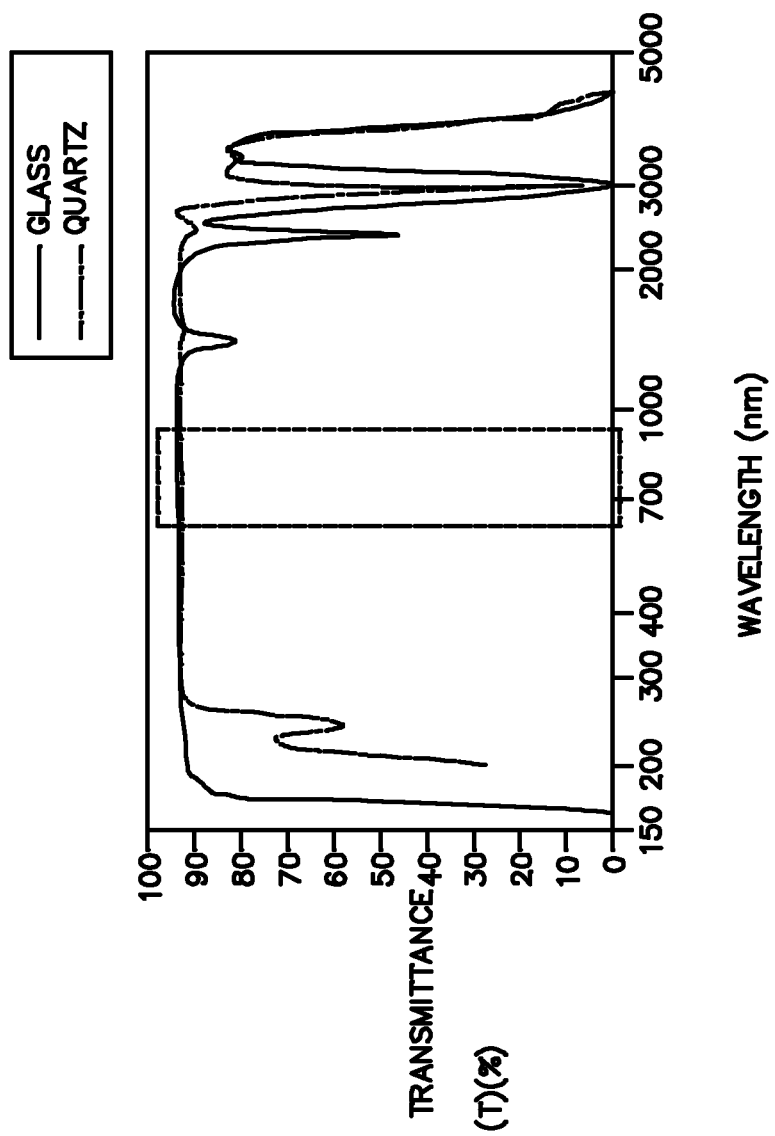
FIG. 6A is an example plot illustrating light transmittance of the sensor-chip assembly according to some embodiments of the disclosure.

FIG. 6A is an example plot illustrating light transmittance of the sensor-chip assembly according to an embodiment of the disclosure. FIG. 6A depicts a plot of transmittance of light L through different substrate materials, e.g., glass and quartz. As depicted, the light transmittance T of the wavelength of light Ls that passes through the sensor-chip assembly 120 including the substrate 124b made of a quartz or glass material is in the range of from 90% to 95% in the period of wavelengths of 600 nm to 900 nm. Moreover, light transmittance of the sensor-chip assembly 120 including a chip body that includes a substrate 124b made of a quartz or glass material can be high in comparison with other chip body materials, for example, a chip-body having a low stress nitride (LSN) layer formed on a substrate made of silicon can have a light transmittance of 75% to 85% in wavelengths ranging between 600 nm to 900 nm.

As described above, when the light transmittance is high, the sensitivity of the sensor-chip assembly 120 is improved, so it is possible to increase detectability of target substances, e.g., low-molecular-weight or small amounts of target substances.

Figure 6C:
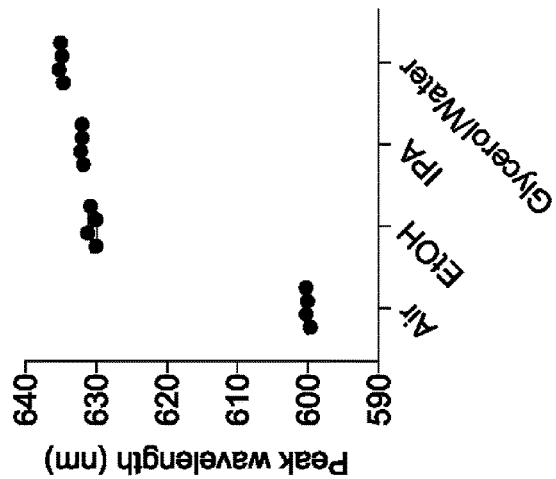
FIG. 6C is an example plot illustrating peak wavelengths of transmitted light through nanoholes measured for various target substances utilizing a sensor assembly according to some embodiments of the disclosure.
Figure 6D:
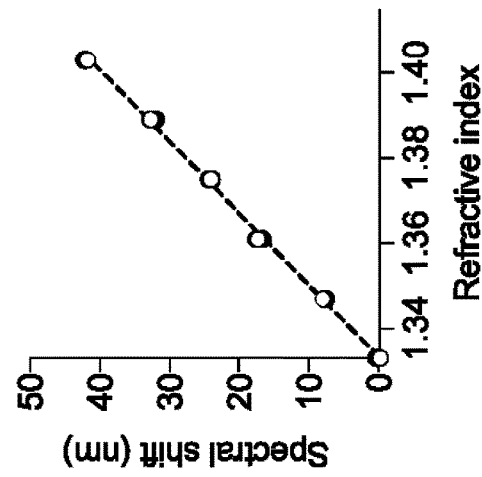
FIG. 6D is an example plot illustrating a measured spectral shift of transmitted light through nanoholes versus refractive index for a sensor assembly according to some embodiments of the disclosure.
Figure 6B:
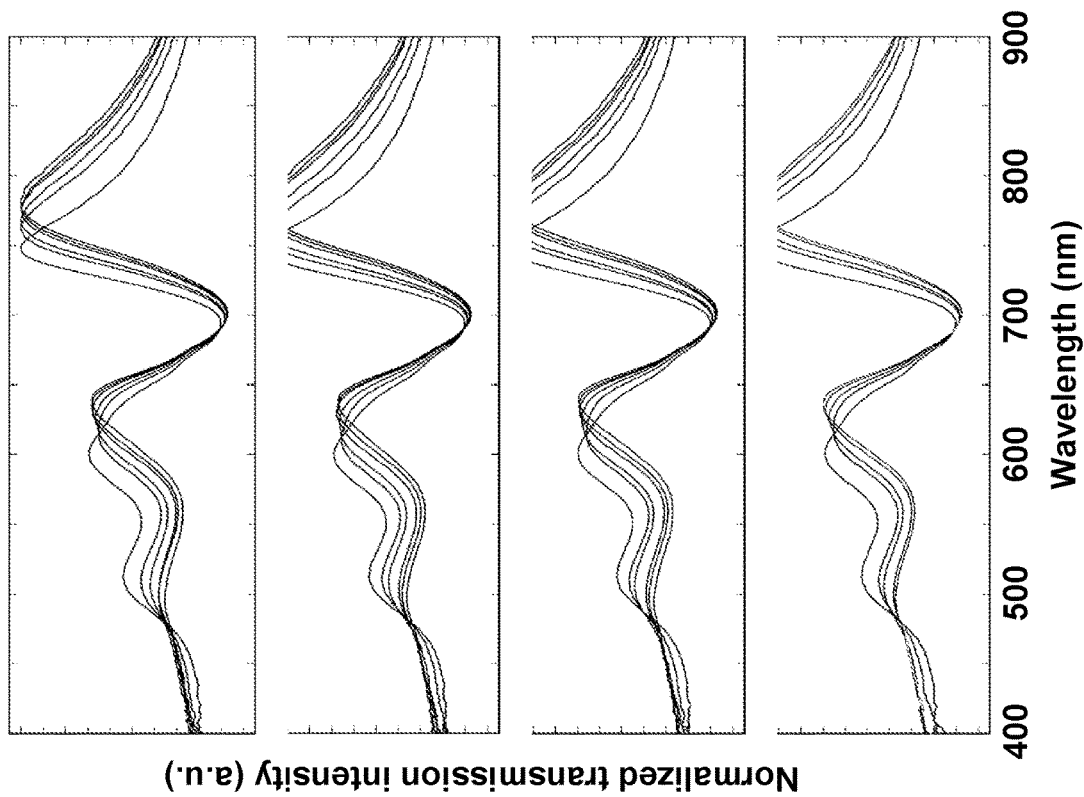
FIG. 6B is an example plot illustrating normalized light transmittances of the nanohole sensor-chip assembly for various solutions according to some embodiments of the disclosure.

FIGS. 6B-6D depict example plots of measured characteristics of various solutions utilizing a nanohole sensor assembly according to some embodiments of the disclosure. Solutions included ethanol (EtOH), air, isopropyl alcohol (IPA), and a glycerol/water mixture were measured utilizing a sensor assembly (e.g., sensor-chip assembly 320 described with reference to FIGS. 10-11 below) in order to vary a refractive index of the sensor surface (e.g., surface of chip body 324) and measure optical light transmission signal changes, e.g., using light receiver 130. Resulting measurements, as presented in FIGS. 6B-6D, show spectral shifts of transmitted light through nanoholes upon changes of the surface refractive indices with narrow variations between measurements and excellent linear responses, indicating improved robustness and reproducibility of measurements between multiple samples utilizing sensor assemblies according to embodiments of this disclosure. FIG. 6B is an example plot illustrating four independent measurements of normalized light transmittances of the nanohole sensor-chip assembly for various solutions according to some embodiments of the disclosure.

FIG. 6C is an example plot illustrating peak wavelengths of transmitted light through nanoholes measured for various target substances utilizing a sensor assembly according to some embodiments of the disclosure.

FIG. 6D is an example plot illustrating a measured spectral shift of transmitted light through nanoholes versus refractive index for a sensor assembly according to some embodiments of the disclosure.

Example Method of Fabrication of Sensor-Chip

FIGS. 7A-E are a view illustrating a method of manufacturing a chip body according to an embodiment of the disclosure, to fabricate nanoholes 124d within the metal layer 124c of the chip body 124. Referring to FIG. 7A, a method of manufacturing a chip body 124 to be included as a component of a sensor-chip assembly 120 includes a process of preparing the substrate 124b with the surface washed clean. Cleaning a surface of the substrate 124b can depend in part on a material of the substrate 124b.

In some implementations, cleaning the surface of the substrate 124b can include, for example, sequential washing using acetone, methanol, and isopropyl alcohol, piranha cleaning, e.g., mixture of sulfuric acid with hydrogen peroxide, plasma O2 ashing, or a combination thereof.

Referring to FIG. 7B, the method of manufacturing the chip body 124 further includes a process of forming the metal layer 124c on a surface of the substrate 124b. In one example, a metal layer 124c is made of gold (Au) on a side of the substrate 124b. Forming the metal layer 124c can be performed using various fabrication techniques, for example, electron-beam deposition to form the metal layer 124c on a side of the substrate 124b, chemical-vapor deposition (CVD), sputtering, or the like. Metal layer 124c can have thickness ranging between, for example, 10-300 nanometers.

In some implementations, a second metal layer 133 (depicted in FIG. 7B as an optional dashed line) made of a material different from the metal layer 124c, can be formed first between the surface of the substrate 124b and the metal layer 124c to improve the coupling force between the side of the substrate 124b and the metal layer 124c. Forming the second metal layer can be performed using various fabrication techniques, for example, electron-beam deposition, CVD, sputtering, or the like. Second metal layer can have a thickness ranging between, for example, 1-10 nanometers.

In some implementations, a passivation layer 135 (depicted in FIG. 7B as an optional dashed layer 135), e.g., SiO2, HfO2, Al2O3, or the like, can be formed on a top surface of the metal layer. The passivation layer can be formed using methods including, for example, electron beam lithography, chemical vapor deposition, sputtering, or atomic layer deposition, and optionally in combination with an oxidation process. A passivation layer can have a thickness ranging between, for example, 1 to 50 nanometers.

Referring to FIG. 7C, the method of manufacturing the chip body 124 further includes a process of forming a photoresist PR pattern on the metal layer 124c through a photolithograph process after forming the metal layer 124c on a surface of the substrate 124b. The process of forming a photoresist PR pattern on the metal layer 124c can include the steps of i) depositing a layer of photoresist PR on a surface of the metal layer 124c, e.g., using spin-coating or the like, ii) applying a mask including a pattern to the deposited layer of photoresist PR, e.g., using electron beam lithography or optical lithography (e.g., deep UV or extreme UV lithography) to selectively cure the photoresist PR, and iii) developing the photoresist PR. Depending on a material used for the photoresist PR, e.g., a positive resist or negative resist material, areas exposed under UV through the mask can be removed or remain when the photoresist PR is treated with a photoresist developer. Rapid ion etching (ME) can be used to remove any residue on the metal layer 124c after development of the photoresist PR.

Referring to FIGS. 7D-7E, the method of manufacturing the chip body 124 further includes a process of etching the metal layer 124c through the photoresist PR, e.g., as depicted in FIG. 7D, and removing the remaining photoresist PR, e.g., photoresist-stripping, after forming the photoresist pattern on the metal layer 124c, e.g., as depicted in FIG. 7E.

In some implementations, the method of manufacturing the sensor-chip assembly 120 can further include a process of disposing the chip body 124 formed through the processes described above to be accommodated in the base 121 and then coupling and fixing the chip body 124 accommodated in the base 121 to the base 121 using the fixing member 122.

In some implementations, the method of manufacturing the sensor-chip assembly 120 can further include a process of disposing the sealing member 123 between the base 121 and the fixing member 122 and then covering the sensor-chip assembly 120 with the cover 125.

Example Sensor-Chip Assembly

Figure 8:
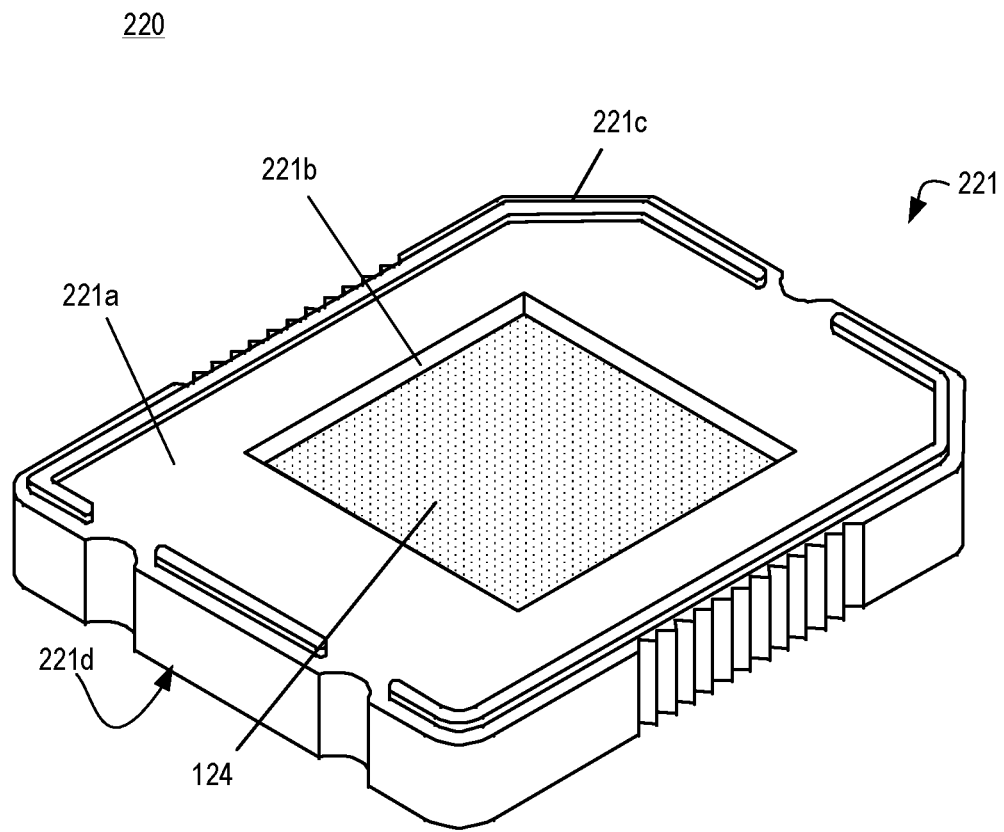
FIG. 8 is a perspective view of a sensor-chip assembly according to another embodiment of the disclosure.

FIG. 8 is a perspective view of a sensor-chip assembly according to another embodiment of the disclosure. Sensor-chip assembly 220 includes a housing 221 to retain a chip body 124, e.g., base 121 as discussed above with reference to FIGS. 1-6 and 7A-7E. Housing 221, as depicted in FIG. 8, includes an accommodating portion 221a, an opening 221b, coupling protrusions 221c, and an underside 221d. As assembled, the sensor-chip assembly 220 can be utilized to process a target substance for analysis while maintaining low-contact between the environment, e.g., a human operator, and the target substance dispensed on a surface of the chip body 124. In some embodiments, sensor-chip assembly 220 can include a cover, e.g., similar to cover 125, that covers chip body 124 when the sensor-chip assembly is assembled.

Figure 9:
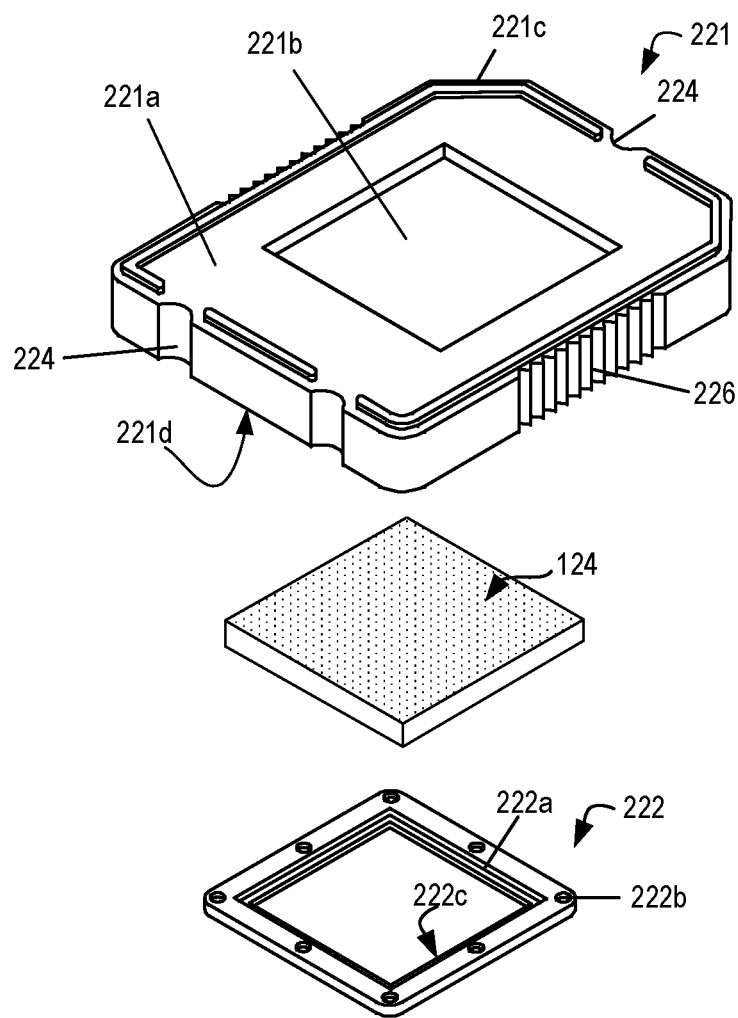
FIG. 9 is an exploded perspective view of the sensor-chip assembly according to another embodiment of the disclosure.

FIG. 9 is an exploded perspective view of the sensor-chip assembly according to another embodiment of the disclosure, and as depicted in FIG. 8. Referring to FIG. 9, a sensor-chip assembly 220 can include a housing 221, a fixing member 222, and a chip body 124. The housing 221 can include an accommodating portion 221a and an opening 221b for accommodating at least a portion of the chip body 124 when the sensor-chip assembly 220 is assembled. The accommodating portion 221a can be formed inside the housing 221, e.g., by extrusion, machining, 3D printing, or the like. Opening 221b can be arranged with respect to the chip body 124 when the sensor-chip assembly 220 is assembled such that the chip body 124 can be exposed to light from a light source 110 through the opening 221b. In other words, light emitted from a light source 110 can be incident on a surface of the chip body 124 that is accommodated in the accommodating portion 221a through the opening 221b.

In some implementations, the housing 221 has coupling protrusions 221c protruding from the top surface of the housing 221. The coupling protrusions 221c can be coupled to an underside 221d of the housing 221 of another sensor-chip assembly 220, such that the coupling protrusions 221c of a first sensor-chip assembly 220 is nested with the undersides 221d of a second sensor-chip assembly 220 when the first and second sensor-chip assemblies 220 are stacked vertically.

In some implementations, multiple sensor-chip assemblies 220 can be vertically stacked for storing or transporting. The coupling protrusions 221c and undersides 221d of sensor-chip assemblies 220 can be each respectively positioned relative to the housing 221 of the sensor-chip assemblies 220 to result in stability of the stacked structure. In some implementations, chip body 124 stored within a sensor-chip assembly 220 is recessed relative to housing 221 such that stacking multiple sensor-chip assemblies 220 is isolated from the environment, e.g., components of a first sensor-chip assembly 220 stacked on top of a second sensor-chip assembly 220 does not touch the chip body 124 retained in the second sensor-chip assembly. Accordingly, the sensor-chip assemblies 220 can be stably stored and carried in the stacked state.

Fixing member 222 can include supporting portions 222a supporting at least a portion of the chip body 124 and coupling portions 222b that couple the fixing member 222 to the housing 221 when the sensor-chip assembly 220 is assembled. In other words, supporting portions 222a support a portion of the chip body when the chip body 124 is within the accommodating portion 221a, and coupling portions 222b are coupled to the housing 221.

Supporting portions 222a can be formed along with the inner sides 222c of the fixing member 222 and formed, e.g., extruded, machined, 3D printed, etc., to support at least a portion of the chip body 124 when the sensor-chip assembly 220 is assembled, e.g., an outer perimeter of the chip body 124.

Coupling portions 222b can be portions for coupling and affixing the fixing member 222 to the housing 221 and can be, for example, through-holes for thread-fastening or the like. The coupling portions 222b are not limited to through-holes and can be provided as other fastening structures, for example, protrusions that can be fitted in grooves, grooves that can receive protrusions, clips, pressure-based fasteners, adhesive-based fasteners, hook-and-loop fasteners, or the like.

In some implementations, sensor-chip assembly 220 can further include one or more alignment features 224 for aligning the sensor-chip assembly 220 with respect to a testing system, e.g., bio-sensor system 100. Alignment features 224 can include, for example, notches, tabs, hash marks, or other physical registration marks for aligning sensor-chip assembly 220 with respect to a testing system.

In some implementations, sensor-chip assembly 220 can further include handling features 226. Handling features 226 can include physical features formed in one or more of the components of the sensor-chip assembly 220, e.g., in housing 221, to assist in ease of handling and reduce contamination by a user and/or automated system, e.g., a robotic manipulator. In one example, as depicted in FIG. 9, handling feature 226 can be ridges formed on outer surfaces of the housing 221 to provide tactile grip on the sensor-chip assembly 220.

Figure 10:
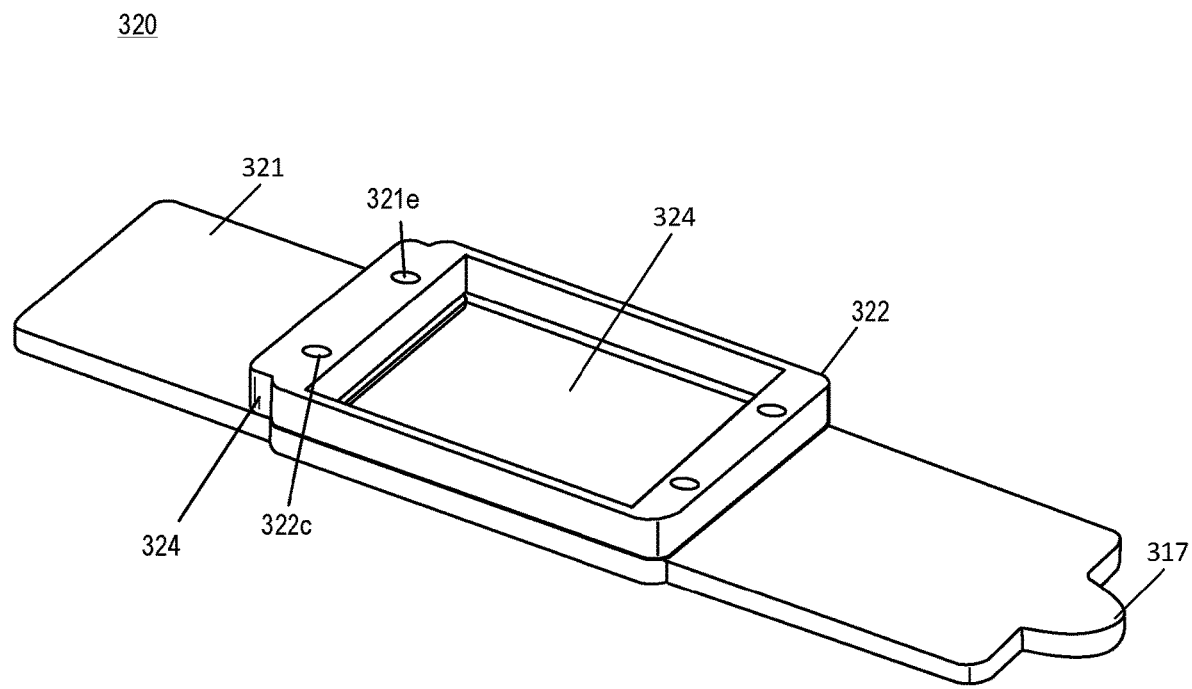
FIG. 10 is a perspective view of a sensor-chip assembly according to another embodiment of the disclosure.

FIG. 10 is a perspective view of a sensor-chip assembly according to another embodiment of the disclosure. Sensor-chip assembly 320 can be made of plastic, e.g., polyastic acid (PLA), acrylonitrile butadiene styrene (ABS), acrylic, high density polyethylene (HDPE), polycarbonate, etc.), resins, metal, carbon, glass, or other inert materials. Components of the sensor-chip assembly 320 may be manufactured using additive manufacturing techniques and/or computer numerically controlled (CNC) machining processes (e.g., CNC milling). The sensor-chip assembly 320 includes a base 321, for example, a microscope slide or another supportive base (e.g., machined from a plastic material). The base 321 can include an alignment feature 317, e.g., a notched portion, which can be used as an alignment point to align the sensor-chip assembly 320 with respect to the bio-sensor system 100 in order to perform a measurement on a volume of a target substance disposed on a chip body 324 using the sensor-chip assembly 320. In one example, alignment feature 317 can be used to align the base 321 on a microscope stand or another similar fixture of the bio-sensor system 100.

Sensor-chip assembly 320 further includes fixing member 322, described below in further detail with reference to FIG. 11. Fixing member 322 can be affixed to base 321 by a set of fastening protrusions 321e, e.g., pillars, that may be machined and/or fabricated as a part of base 321, where fixing member 322 includes one or more first fastening holes 322c configured to accommodate the fastening protrusions 321e when the fixing member 322 is affixed to base 321.

Figure 11:
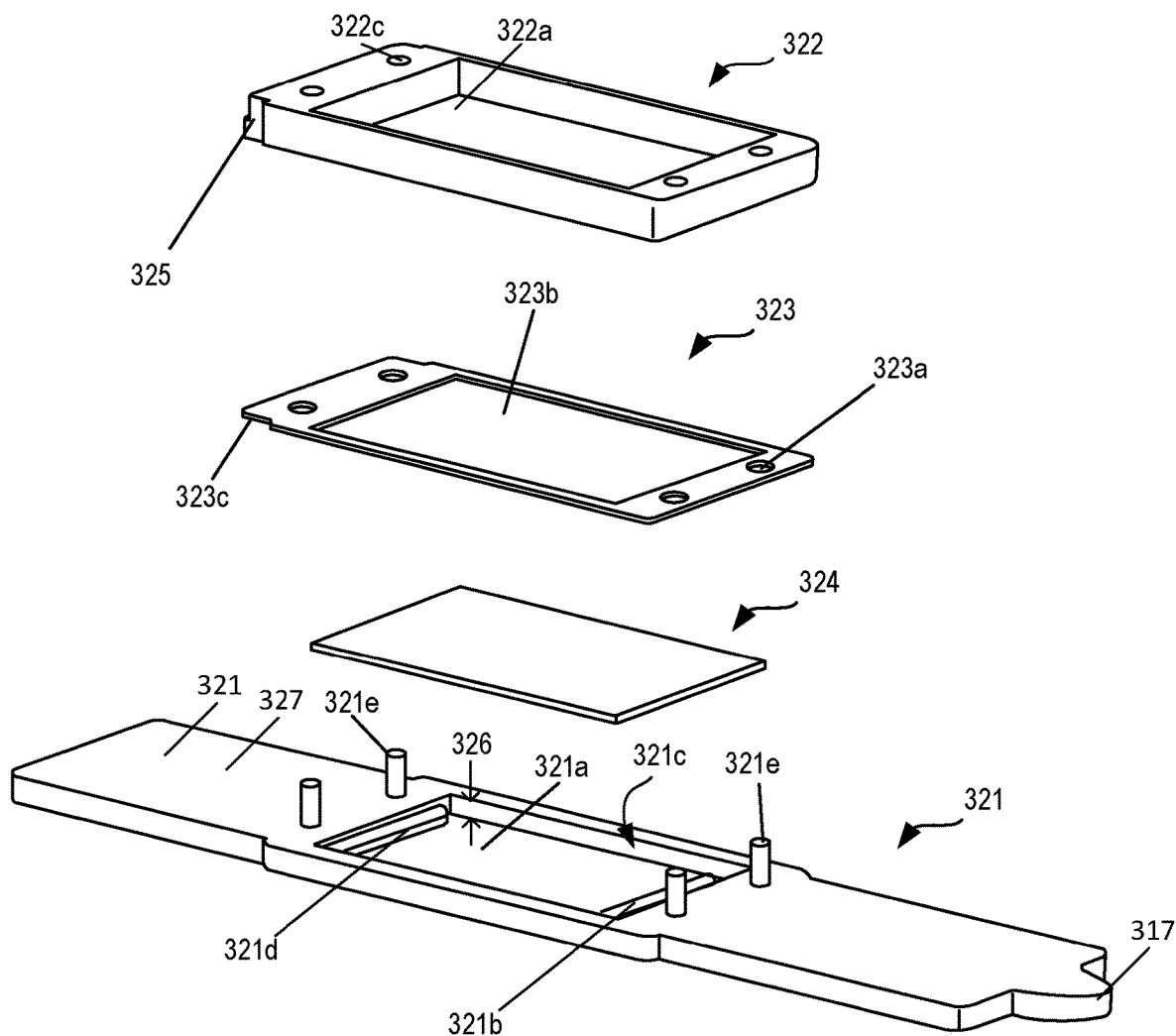
FIG. 11 is an exploded perspective view of the sensor-chip assembly according to another embodiment of the disclosure.

Referring now to FIG. 11 is an exploded perspective view of the sensor-chip assembly according to an embodiment of the disclosure, e.g., as depicted in FIG. 10. The sensor-chip assembly 320 can include a base 321, a fixing member 322, a sealing member 323, and a chip body 324. Though sensor-chip assembly 320 is described herein as including components including a base 321, a fixing member 322, a sealing member 323, and a chip body 324, more or fewer components can be included in the sensor-chip assembly 320 without limiting the functionality of the sensor-chip assembly 320 in the bio-sensor system 100 (e.g., may include additionally a cover similar to cover 125 described with reference to FIGS. 2 and 3).

Base 321 can include an alignment feature 317, e.g., a tab or notch along a perimeter of base 321, that can be used to align the sensor-chip assembly 320 with respect to a bio-sensor system 100, e.g., align with respect to a light source 110. In some implementations, alignment feature 317 can be utilized by a human operator and/or robotic operator to handle the sensor-chip assembly 320 in a low-contact manner such that the human or robotic operator does not contact a portion of the sensor-chip assembly 320 that includes the chip body 324.

Base 321 can include an accommodating portion 321a into which the chip body 324 is accommodated and a supporting portion 321b protruding toward the accommodating portion 321a from an inner surface 321c of the base 321, e.g., a lip extending into the accommodating portion 321a from one or more inner surfaces 321c of the base 321. In other words, chip body 324 can be at least partially retained in a window defined by the accommodating portion 321a and supported at least partially within the accommodating portion 321a by the supporting portion 321b. Accommodating portion 321a can be a window that has been removed or formed in the base 321. In some implementations, as depicted in FIG. 3, accommodating portion 321a is rectangular in shape. Accommodating portion 321a can alternatively be polygonal, circular, elliptical or another similar shape.

In some implementations, accommodating portion 321a is a window in base 321 such that accommodating portion 321a spans the thickness 326 of the base 321. In other words, accommodating portion 321a is a complete cut-out from base 321, e.g., for base 321 made of a plastic (e.g., Teflon) or another material with poor transmission for wavelengths of light signal LS. In some implementations, accommodating portion 321a is a partial cut-out from base 321 such that the accommodating portion 321a spans less than a full thickness 326 of the base 321, e.g., for a base 321 made of glass, quartz, or another material with a threshold transmission for wavelengths of light signal LS.

The supporting portion 321b can include multiple protrusions 321d supporting the chip body 324 in contact with the bottom surface of the chip body 324, such that the chip body 324 is supported by the multiple protrusions 321d while at least partially retained within the base 321. The multiple protrusions 321d can be formed or machined from the base 321 to support the edges of the chip body 324 when the chip body 324 is at least partially retained within the base 321. In some implementations, the multiple protrusions 321d can be affixed to the base 321, e.g., using adhesive.

The multiple protrusions 321d of the supporting portion 321b, as depicted in FIG. 11, can be rectangular in shape forming a "lip" around a portion of the perimeter defined by the accommodating portion 321a. In some implementations, other shapes and arrangement of the multiple protrusions 321d can be used to form the supporting portion 321b. For example, triangular protrusions 321d nested in each corner of the accommodating portion 321a can be utilized. In another example, a set of pins extending from the inner surface 321c into the accommodating portion 321a can form the supporting portion 321b.

The base 321 further can include multiple fastening protrusions 321e protruding upward from a top surface 327 of the base 321. The fastening protrusions 321e can be arranged on the top surface 327 of the base 321 such that, when the sensor-chip assembly 320 is assembled, a set of first fastening holes 322c formed within the fixing member 322 and a set of second fastening holes 323a in a sealing member 323 are aligned and secured with respect to the fastening protrusions 321e. As depicted in FIG. 11, four cylindrical fastening protrusions 321e are arranged with respect to the accommodating portion 321a, e.g., one on each respective corner of the window defined by the accommodating portion 321a. Other configurations including more or fewer fastening protrusions are contemplated. In some implementations, the fastening protrusions 321e can include cross-sectional shape that is rectangular, elliptical, polygonal, or the like.

A fixing member 322 can include an opening 322a and multiple first fastening holes 322c. In some implementations, as depicted in FIG. 11, fixing member 322 includes a alignment feature 325 which may be utilized to designate a particular (preferred) orientation of the fixing member 322 with respect to the base 321 when the sensor-chip assembly 320 is assembled. Opening 322a, as depicted in FIG. 11, can be a rectangular window defined in the fixing member 322. Other shaped windows defined in the fixing member 322 are possible, e.g., elliptical, polygonal, circular, or the like. In some implementations, opening 322a is defined such that a shape and dimensions of the opening 322a define a first area that is approximately equal to a second area defined by a shape and dimensions of the accommodating portion 321a.

The multiple first fastening holes 322c can be formed, e.g., fabricated using CNC machining processes, surrounding opening 322a. The multiple first fastening holes 322c can be arranged with respect to the fixing member 322 such that, when the fixing member is assembled in the sensor-chip assembly 320, at least one of the first fastening holes 322c accommodates a respective fastening protrusion 321e. The fixing member 322 is coupled to the top surface 327 of the base 321 where at least one first fastening hole 322c accommodates a fastening protrusion 321e, thereby holding the chip body 324 fixed when the chip body is at least partially retained in the accommodating portion 321a of the base 321. First fastening holes 322c can have a shape and dimensions selected to accommodate the cross-sectional shape and dimensions of the fastening protrusions 321e, e.g., circular, rectangular, elliptical, polygonal, or the like.

In some implementations, sealing member 323 is disposed between the base 321 and the fixing member 322 when the sensor-chip assembly 120 is assembled, where the sealing member 323 can function to provide a seal between the base 321 and the fixing member 322. The sealing member 323 can retain a volume of analysis target substances dispensed on the chip body 324 and prevent the volume of analysis target substances dispensed on the chip body 324 from leaking to areas outside of the chip body 324.

The sealing member 323 can include multiple second fastening holes 323a, opening 323b, and alignment feature 323c. The second fastening holes 323a can be arranged with respect to the sealing member 323 such that, when the sensor-chip assembly 320 is assembled, at least one of the second fastening holes 323a accommodates a fastening protrusion 321e and where at least one of the second fastening holes 323a is aligned with a first fastening hole 322c. The second fastening holes 323a can be fitted on the fastening protrusions 321e, respectively, such that the sealing member 323 can be aligned at a predetermined position with respect to the base 321. Alignment features 323c can indicate a particular orientation of the sealing member with respect to base 321 and fixing member 322, such that a user assembling the sensor assembly can more easily recognize a preferred orientation of the components of the sensor assembly.

The sealing member 323 can include a silicon or rubber material to create a seal and prevents leakage of analysis target substances. The sealing member 323 may be composed of an inert material, e.g., one that does not significantly chemically react with analysis target substances. In some implementations, the sealing member 323 can be integrally formed with the fixing member 322, e.g., extruded or 3D-printed.

In some implementations, base 321, fixing member 322, and sealing member 323 of the components of the sensor-chip assembly 320 described above are not necessary parts of the sensor-chip assembly 320, and the sensor-chip assembly 320 can include only the chip body 324.

In some implementations, sensor-chip assembly 320 can be composed of any one of the base 321, the fixing member 322, and the sealing member 323, or a combination of two or more of them, with the chip body 324. For example, the sensor-chip assembly 320 can be composed of only the base 321 and the chip body 324 or can be composed of only the base 321, the fixing member 322, and the chip body 324.

Similarly to the description of the chip body 124 described with reference to FIGS. 2-3, Chip body 324 can be fabricated to include a substrate, one or more metal layers, and a plurality of nanoholes formed within the one or more metal layers, as described with reference to chip body 124 in FIGS. 2-3, and 7A-7E.

Although exemplary embodiments of the disclosure are illustrated and described above, the disclosure is not limited to the specific exemplary embodiments and can be modified in various ways by those skilled in the art without departing from the scope of the disclosure described in claims, and the modified examples should not be construed independently from the spirit of the scope of the disclosure.

Various embodiments are described hereafter in detail with reference to the accompanying drawings. The embodiments described herein can be changed in various ways. Specific embodiments can be depicted in the drawings and described in detail in the following detailed description. However, the specific embodiments disclosed in the accompanying drawing are provided only to help easily understand various embodiments. Accordingly, the spirit of the disclosure is not limited to the specific embodiments disclosed in the accompanying drawings and should be construed as including all equivalents or replacements included in the scope and spirit of the disclosure.

When a component is described as being formed "on" another component, it does not exclude that another component exists between the component and the another component. That is, the component can be formed in direct contact with another component, or another component can be disposed between the component and the another component.

Terms including ordinal numbers such as 'first', 'second', etc., can be used to describe various components, but the components are not to be construed as being limited to the terms. The terms are used only to distinguish one component from another component.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof. It is to be understood that when one element is referred to as being "connected to" or "coupled to" another element, it can be connected directly to or coupled directly to another element or be connected to or coupled to another element, having the other element intervening there between. On the other hand, it is to be understood that when one element is referred to as being "connected directly to" or "coupled directly to" another element, it can be connected to or coupled to another element without the other element intervening there between.

In the meantime, "module" or "unit" for components used in the specification performs at least one function or operation. Further, "module" or "unit" can perform functions or operations by hardware, software, or a combination of hardware and software. Further, a plurality of "modules" or a plurality of "units" excepting a "module" or a "unit" that should be executed by specific hardware or that is executed by at least one processors can be integrated at least one module. Singular forms are intended to include plural forms unless the context clearly indicates otherwise.

In addition, in describing the disclosure, if it is determined that the detail description of relevant known functions or components makes subject matters of the disclosure, the detailed description thereof will be shortened or omitted.

While this specification contains many specific implementation details, these should not be construed as limitations on the scope of any features or of what can be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A sensor-chip assembly for detecting a target substance using surface plasmon resonance, the sensor-chip assembly comprising:
    a chip body comprising a substrate, at least one metal layer formed on the substrate, and a plurality of nano-holes formed in the metal layer;
    a base having an accommodating portion for accommodating the chip body;
    a fixing member fixing the chip body accommodated in the accommodating portion by being coupled to the base, the fixing member comprising a body including internal walls defining an opening formed through the body through which a first surface of the chip body is exposed; and
    a cover covering the chip body exposed through the opening of the fixing member,
    wherein a volume is defined in part by the first surface of the chip body, the internal walls of the fixing member and a surface of the cover.

2. The sensor-chip assembly of claim 1, wherein the at least one metal layer includes any one of gold (Au), silver (Ag), copper (Cu), aluminum (Al), and an alloy thereof.

3. The sensor-chip assembly of claim 1, wherein the base includes at least one fastening protrusion protruding from a top surface of the base.

4. The sensor-chip assembly of claim 1, further comprising a sealing member disposed between the base and the fixing member.

5. The sensor-chip assembly of claim 4, wherein the volume is further defined by a third surface of the sealing member.

6. The sensor-chip assembly of claim 1, wherein the volume retains at least a threshold volume of the target substance.

7. The sensor-chip assembly of claim 6, wherein the threshold volume of the target substance comprises a volume of the target substance sufficient to contact the surface of the cover and the target substance is uniformly distributed on the first surface of the chip body when the threshold volume of the target substance is dispensed.

8. A sensor-chip assembly for detecting a target substance using surface plasmon resonance, the sensor-chip assembly comprising:
    a chip body comprising a substrate, at least one metal layer formed on the substrate, and a plurality of nano-holes formed in the metal layer;
    a housing having an accommodating portion for accommodating the chip body; and
    a fixing member fixing the chip body accommodated in the accommodating portion by being coupled to the housing, the fixing member comprising a body including internal walls defining an opening formed through the body through which a first surface of the chip body is exposed; and
    a cover covering the first surface of the chip body exposed through the opening formed through the body of the fixing member, and
    wherein a volume is defined in part by the first surface of the chip body, a second surface of the housing and a third surface of the cover.

9. The sensor-chip assembly of claim 8, wherein the housing includes at least one receptacle for coupling the fixing member to the housing.

10. The sensor-chip assembly of claim 8, wherein the volume retains at least a threshold volume of the target substance.

11. The sensor-chip assembly of claim 10, wherein the threshold volume of the target substance comprises a volume of the target substance sufficient to contact the third surface of the cover and the target substance is uniformly distributed on the first surface of the chip body when the threshold volume of the target substance is dispensed.

12. The sensor-chip assembly of claim 8, further comprising an alignment feature to align the sensor-chip assembly with respect to a sensor system.

13. The sensor-chip assembly of claim 8, wherein the second surface of the housing comprises a portion of sidewalls defining part of the accommodating portion of the housing.

14. A method of manufacturing a sensor-chip assembly for detecting a target substance using surface plasmon resonance, the method comprising:
   preparing a chip body, the preparation comprising:
      preparing a substrate including a glass or quartz material;
      forming a metal layer on a side of the substrate;
      forming a photoresist pattern on the metal layer through a photolithography process; and
      forming nanoholes on the metal layer by etching and removing photoresist remaining on the metal layer;
   preparing a base having an accommodating portion;
   disposing the chip body to be accommodated in the accommodating portion;
   fixing the chip body accommodated in the accommodating portion to the base using a fixing member, the fixing member comprising a body including internal walls defining an opening formed through the body through which a first surface of the chip body is exposed, wherein a volume is defined in part by the first surface of the chip body and the internal walls of the fixing member;
   dispensing the target substance on the metal layer of the chip body, the metal layer comprising the first surface of the chip body, wherein the dispensed target substance is at least a threshold volume of target substance; and
   covering an exposed surface of the dispensed target substance with a cover.

15. The method of claim 14, further comprising:
   disposing a sealing member between the base and the fixing member.

16. The method of claim 14, wherein the dispensed target substance contacts at least the first surface of the metal layer of the chip body, a second surface of the base, and a third surface of the cover.

17. The method of claim 14, further comprising:
   exposing a top surface of the sensor-chip assembly to light emitted from a light source, wherein light from the light source that is incident on the chip body generates a surface plasmon resonance on the first surface of the chip body; and
   collecting, at a light receiver, a transmitted light signal from a bottom surface of the sensor-chip assembly.

18. The method of claim 17, further comprising:
   determining, from the light emitted from the light source and the transmitted light signal collected at the light receiver, a property of the target substance.

* * * * *